United States Patent
Charania et al.

(10) Patent No.: US 9,693,107 B2
(45) Date of Patent: Jun. 27, 2017

(54) USER CONFIGURED SOCIAL MEDIA FEEDS ASSOCIATED WITH AN INTERACTIVE PROGRAM GUIDE

(71) Applicants: Cellco Partnership, Basking Ridge, NJ (US); Verizon Patent and Licensing Inc., Basking Ridge, NJ (US)

(72) Inventors: Rahim A. Charania, Euless, TX (US); Bradley D. Beaver, Richardson, TX (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/262,036

(22) Filed: Apr. 25, 2014

(65) Prior Publication Data

US 2015/0312635 A1    Oct. 29, 2015

(51) Int. Cl.
*H04N 5/445* (2011.01)
*H04N 21/4788* (2011.01)
*H04N 21/488* (2011.01)
*H04N 21/63* (2011.01)

(52) U.S. Cl.
CPC ....... *H04N 21/4788* (2013.01); *H04N 21/488* (2013.01); *H04N 21/632* (2013.01)

(58) Field of Classification Search
CPC ............. H04N 21/475; H04N 21/4755; H04N 21/478; H04N 21/4782; H04N 21/4788; H04N 21/482; H04N 21/4821; H04N 21/485; H04N 21/4858; H04N 21/488; H04N 21/4882; H04N 21/4886
See application file for complete search history.

(56) References Cited

U.S. PATENT DOCUMENTS

| | | | |
|---|---|---|---|
| 2010/0319034 A1* | 12/2010 | Mountain | H04N 5/44513 725/68 |
| 2011/0258656 A1* | 10/2011 | Michel | H04N 21/4307 725/27 |
| 2012/0042334 A1* | 2/2012 | Choi et al. | 725/32 |
| 2012/0124620 A1* | 5/2012 | Nishizawa | H04N 21/4316 725/34 |
| 2012/0192227 A1* | 7/2012 | Fleischman | H04N 21/2407 725/34 |
| 2014/0068689 A1* | 3/2014 | Sirpal | H04N 21/8173 725/109 |
| 2015/0264445 A1* | 9/2015 | Lock | H04N 21/482 725/39 |

* cited by examiner

*Primary Examiner* — John Schnurr

(57) ABSTRACT

A device may receive an indication associated with media content identified in an interactive program guide (IPG). The device may determine social media feed parameters associated with the IPG. The device may determine, based on the social media feed parameters, that a social media feed is to be displayed along with the media content. The social media feed may be associated with the media content. The device may identify a social media tag associated with the media content. The device may receive social media information associated with the social media tag. The social media information may include information associated with a social media application. The device may provide, for display, the social media feed along with the media content. The social media feed may include the social media information, and may be provided in accordance with the social media feed parameters.

20 Claims, 12 Drawing Sheets

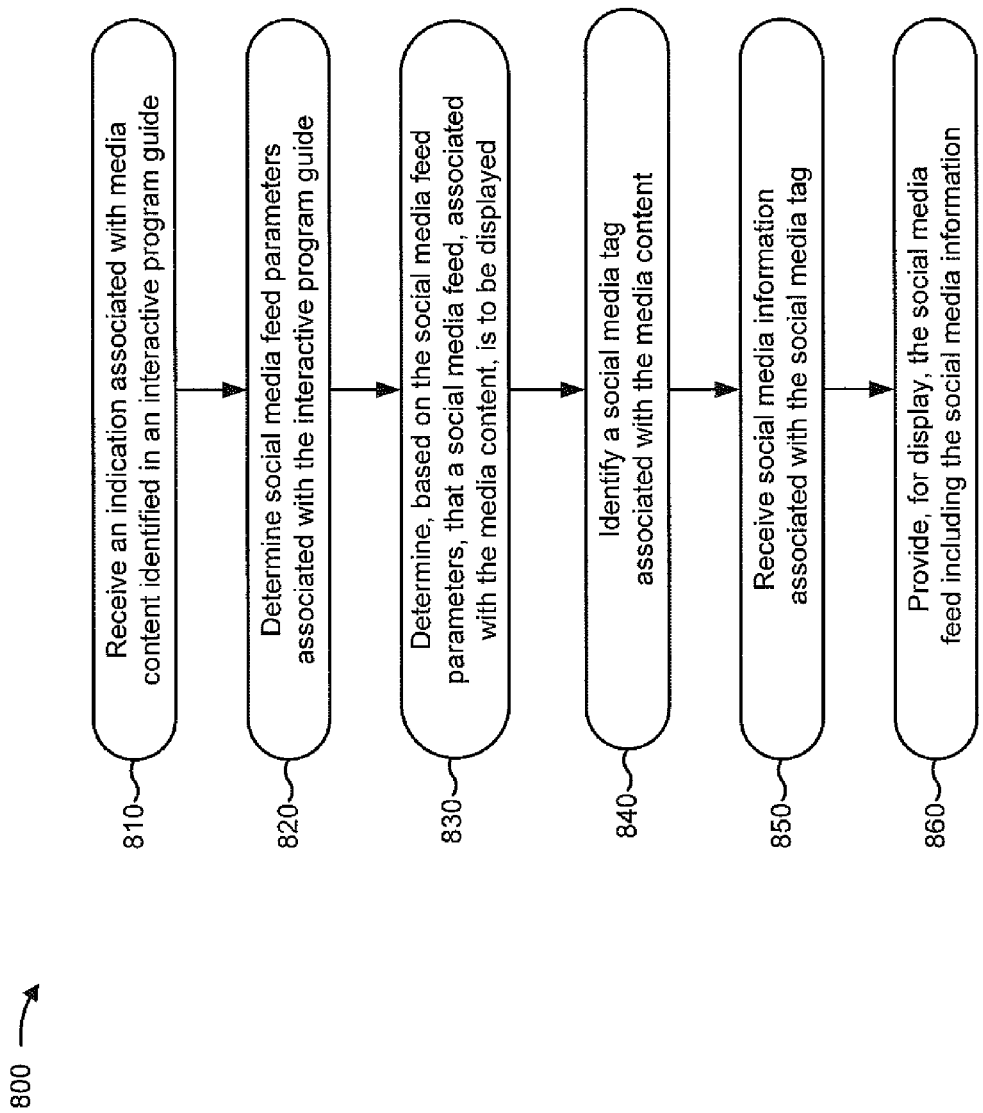

USER CONFIGURED SOCIAL MEDIA FEEDS ASSOCIATED WITH AN INTERACTIVE PROGRAM GUIDE

BACKGROUND

A set-top box may provide an interactive program guide (IPG) (e.g., an interactive electronic program guide (EPG)) that allows a user to navigate through guide data related to media content provided by a service provider.

BRIEF DESCRIPTION OF THE DRAWINGS

FIG. 8 is a flow chart of an example process for identifying a social media tag, associated with media content identified in an interactive program guide, and providing, for display, a social media feed associated with the media content and based on the social media tag.

DETAILED DESCRIPTION OF PREFERRED EMBODIMENTS

The following detailed description of example implementations refers to the accompanying drawings. The same reference numbers in different drawings may identify the same or similar elements.

A user may view media content (e.g., a television program, a movie, a music video, etc.) provided, by a media client (e.g., a set top box), for display via a display device (e.g., a television, a monitor, etc.). In some cases, the user may wish to view and/or interact with social media information relating to the media content. For example, the user may wish to view tweets, comments, statuses, etc., associated with the media content, provided by other users via one or more social media applications, such as Twitter, Facebook, Google+, etc. Currently, the user may view the social media information via another device (e.g., a smart phone, a tablet, etc.). However, viewing the social media information in this manner requires the user to (1) possess another device capable of displaying the social media information, and (2) look away from the media content displayed on the display device. Implementations described herein may allow a media client to provide, for display via a display device, a social media feed that includes social media information associated with one or more social media applications and related to media content being displayed via the display device. In this way, the user may view the media content and may view and/or interact with the social media information via the display device.

Figure 1A:
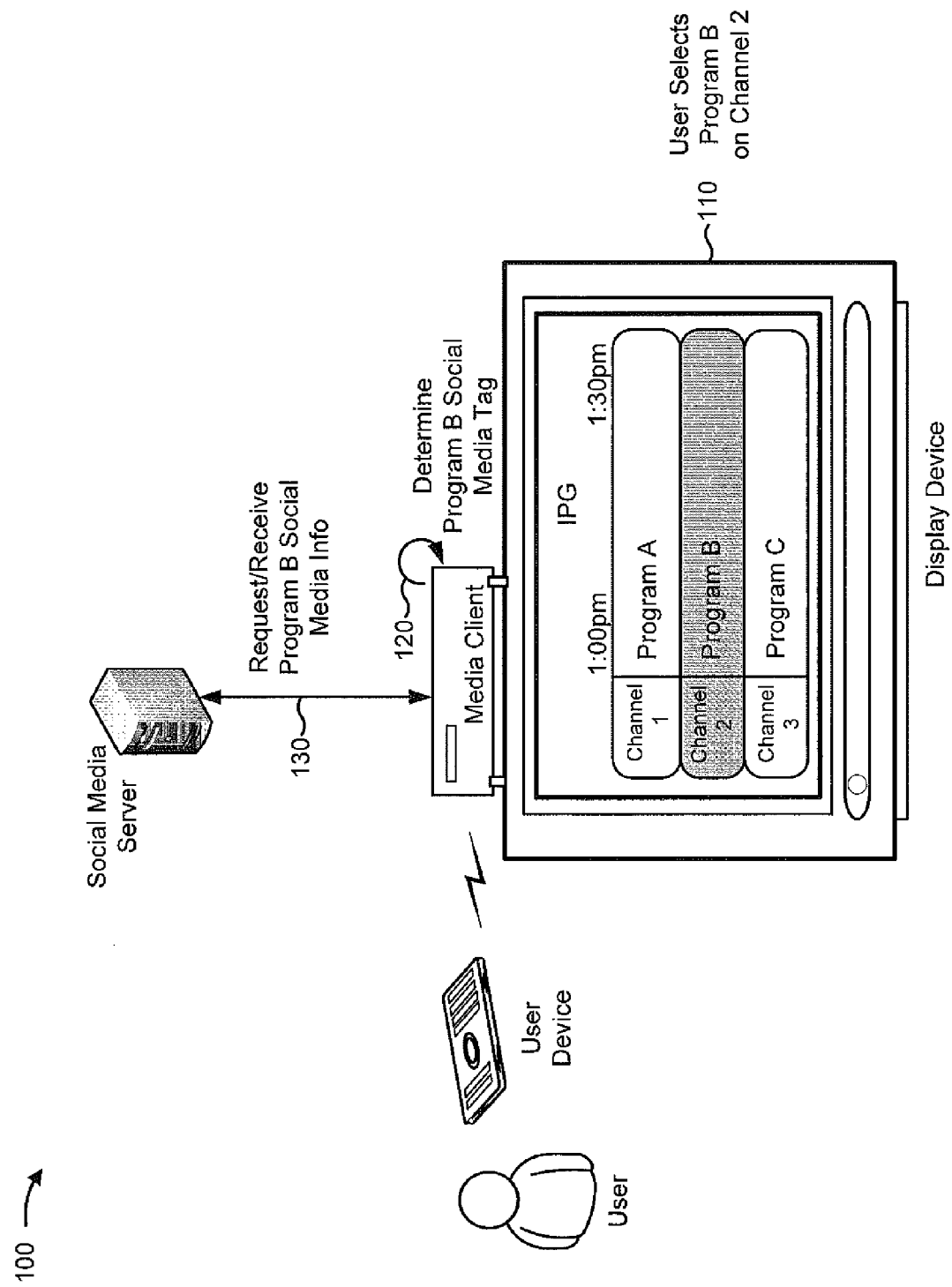
FIGS. 1A and 1B are diagrams of an overview of an example implementation described herein.
Figure 1B:
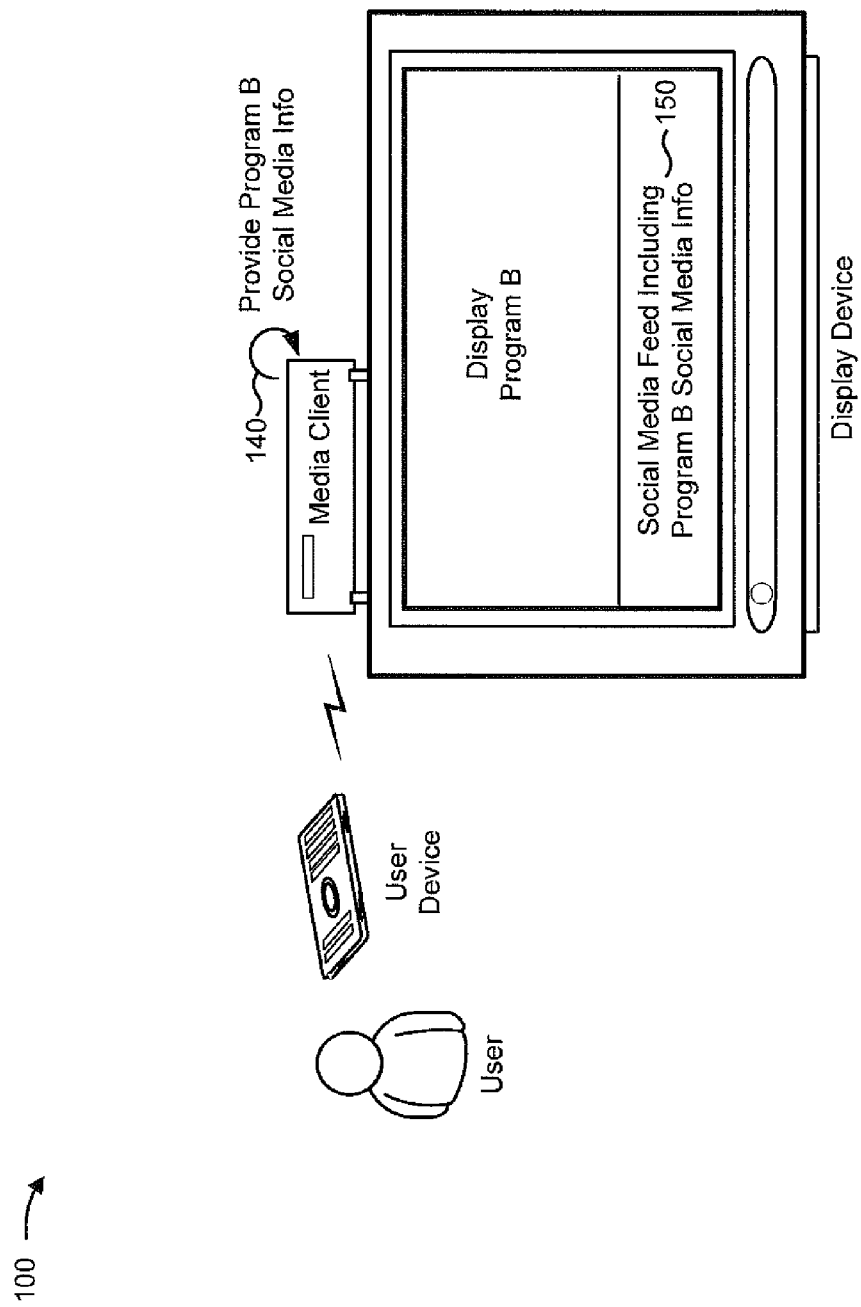

FIGS. 1A and 1B are diagrams of an overview of an example implementation 100 described herein. For the purposes of example implementation 100, assume that a media client stores IPG information, associated with an IPG, that includes information associated with media content identified in the IPG and social media tags associated with the media content. Further, assume that a user is navigating (e.g., using a user device) the IPG, provided by the media client, via a display device. While the processes and/or methods described herein are described in the context of a program provided via a channel, the processes and/or methods described herein may equally apply to other forms of media content provided via the media client (e.g., recorded media content, on-demand media content, etc.).

As shown in FIG. 1A, and by reference number 110, the user may navigate the IPG and may select media content, identified in the IPG as program B, on a channel identified as channel 2 (e.g., when the user wishes to view program B). For the purposes of example implementation 100, assume that the media client is configured to provide a social media feed, associated with a social media application hosted by a social media server, when the user is viewing media content on channel 2. As shown by reference 120, the media client may determine (e.g., based on the IPG information stored by the media client) a social media tag associated with program B.

As shown by reference number 130, the media client may send, to the social media server, a request (e.g., including the social media tag associated with program B) for the social media server to provide social media information associated with program B. As shown, the social media server may receive the request, may determine (e.g., based on the social media tag associated with program B) social media information associated with program B, and may provide the social media information to the media client.

As shown in FIG. 1B, and by reference number 140, the media client may receive the social media information associated with program B. As shown by reference number 150, the media client may provide, for display via the display device, program B in a first portion of a display screen, and may provide the social media feed that includes the social media information in a second portion of the display screen (e.g., such that the social media feed scrolls through the social media information).

In this way, a media client may provide, for display via a display device, a social media feed that includes social media information associated with one or more social media applications and related to media content being displayed via the display device. This may allow a user to view the media content and view and/or interact with the social media information via a single device, such as the display device.

Figure 2:
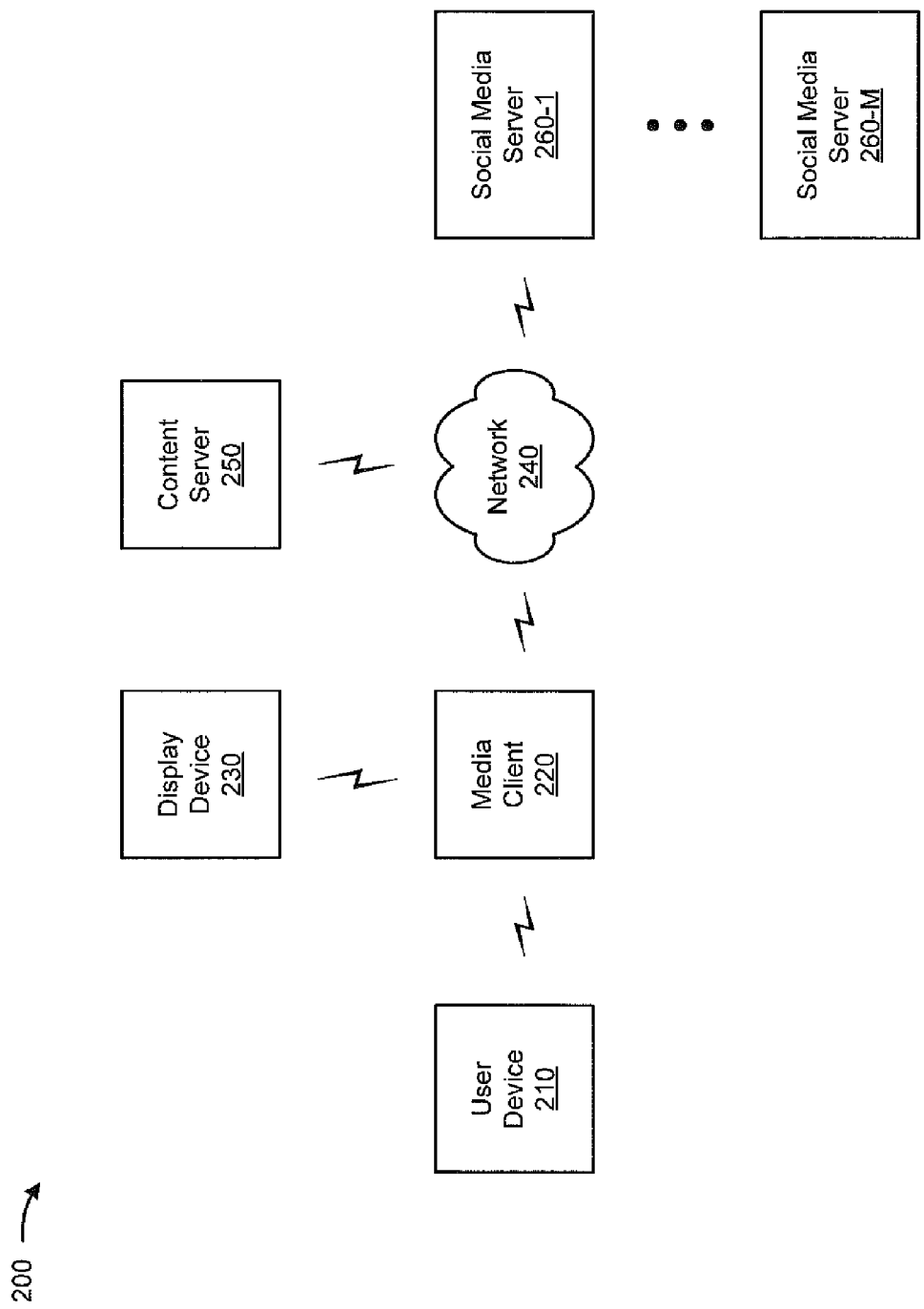
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a media client 220, a display device 230, a network 240, a content server 250, and/or a set of social media servers 260-1 through 260-M (M>1) (hereinafter collectively referred to as "social media servers 260," and individually as "social media server 260"). Devices of environment 200 may interconnect via wired connections, wireless connections, or a combination of wired and wireless connections.

User device 210 may include a device that allows a user to control programming, applications, and/or content displayed on display device 230 via interaction with media client 220. User device 210 may transmit signals, such as, for example, infrared signals, to a signal receiver associated with media client 220. User device 210 may take the form of a remote control, a personal digital assistant ("PDA") (e.g., that can include a radiotelephone, a pager, Internet/intranet access, etc.), a smart phone, a desktop computer, a laptop computer, a tablet computer, and/or another type of wired or wireless device. In some implementations, user device 210, media client 220, and/or display device 230 may be incorporated into a single device.

Media client 220 may include a device capable of receiving, generating processing, storing, and/or providing media content and providing the media content to a user (e.g., via display device 230). Media client 220 may allow a user to provide input associated with an IPG (e.g., to navigate the IPG) and to alter programming and/or content provided by media client 220 based on a signal (e.g., a channel up or channel down signal) from, for example, user device 210. Examples of media client 220 may include a set-top box, a casting stick (e.g., a high-definition media interface (HDMI) dongle), a computer, a cable card, a gaming device, a portable electronic device, and/or another type of device capable of receiving, transmitting, and/or processing multi-media content and providing the multimedia content to a user. In some implementations, media client 220 may be capable of receiving, providing, storing, processing, and/or determining IPG information, social media tag information, a social media feed, and/or social media information associated with media content included in the IPG.

Display device 230 may include any digital or analog display that is capable of presenting audio and/or video content provided by media client 220. Display device 230 may include a technology, such as a cathode ray tube (CRT) display, a liquid crystal display (LCD), a light-emitting diode (LED) display, a plasma display, etc. Examples of display device 230 may include a television, a projector, a computer monitor, and/or another type of devices capable of presenting audio and/or video content.

Network 240 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 240 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a satellite network, a cloud computing network, and/or a combination of these or other types of networks.

Content server 250 may include one or more devices capable of receiving, determining, processing, storing, and/or providing information, such as information associated with the IPG. For example, content server 250 may include a server device or a collection of server devices. In some implementations, content server 250 may include a communication interface that allows content server 250 to receive information from and/or transmit information to other devices in environment 200. In some implementations, content server 220 may provide an IPG to one or more media clients 220. Content server 250 may be dedicated to media clients 220 associated with a single household or a group of households. In some implementations, content server 250 may be capable of receiving, determining, processing, pro-viding, and/or storing (e.g., in a data structure) social media tag information and/or social media information associated with media content included in the IPG.

Social media server 260 may include one or more devices capable of receiving, generating, processing, storing, and/or providing information associated with a social media application. For example, social media server 260 may include a server device or a collection of server devices. In some implementations, social media server 260 may be associated with a social media application associated with a user of user device 210 and/or media client 220. In some implementations, social media server 260 may be capable of receiving, storing, processing, and/or providing social media information associated with media content included in the IPG and a social media tag.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
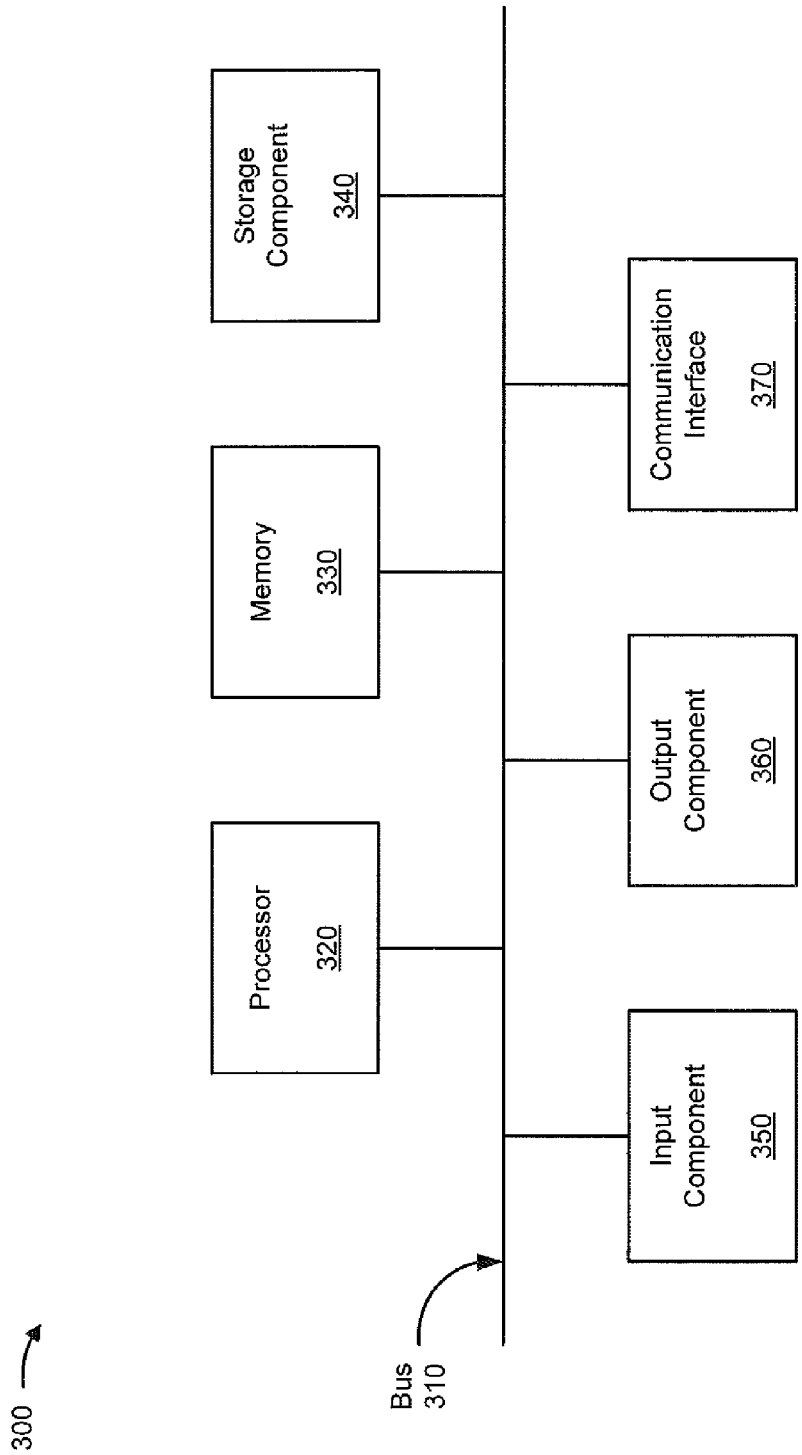
FIG. 3 is a diagram of example components of one or more devices of FIG. 2.

FIG. 3 is a diagram of example components of a device 300. Device 300 may correspond to user device 210, media client 220, display device 230, content server 250, and/or social media server 260. In some implementations, user device 210, media client 220, display device 230, content server 250, and/or social media server 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
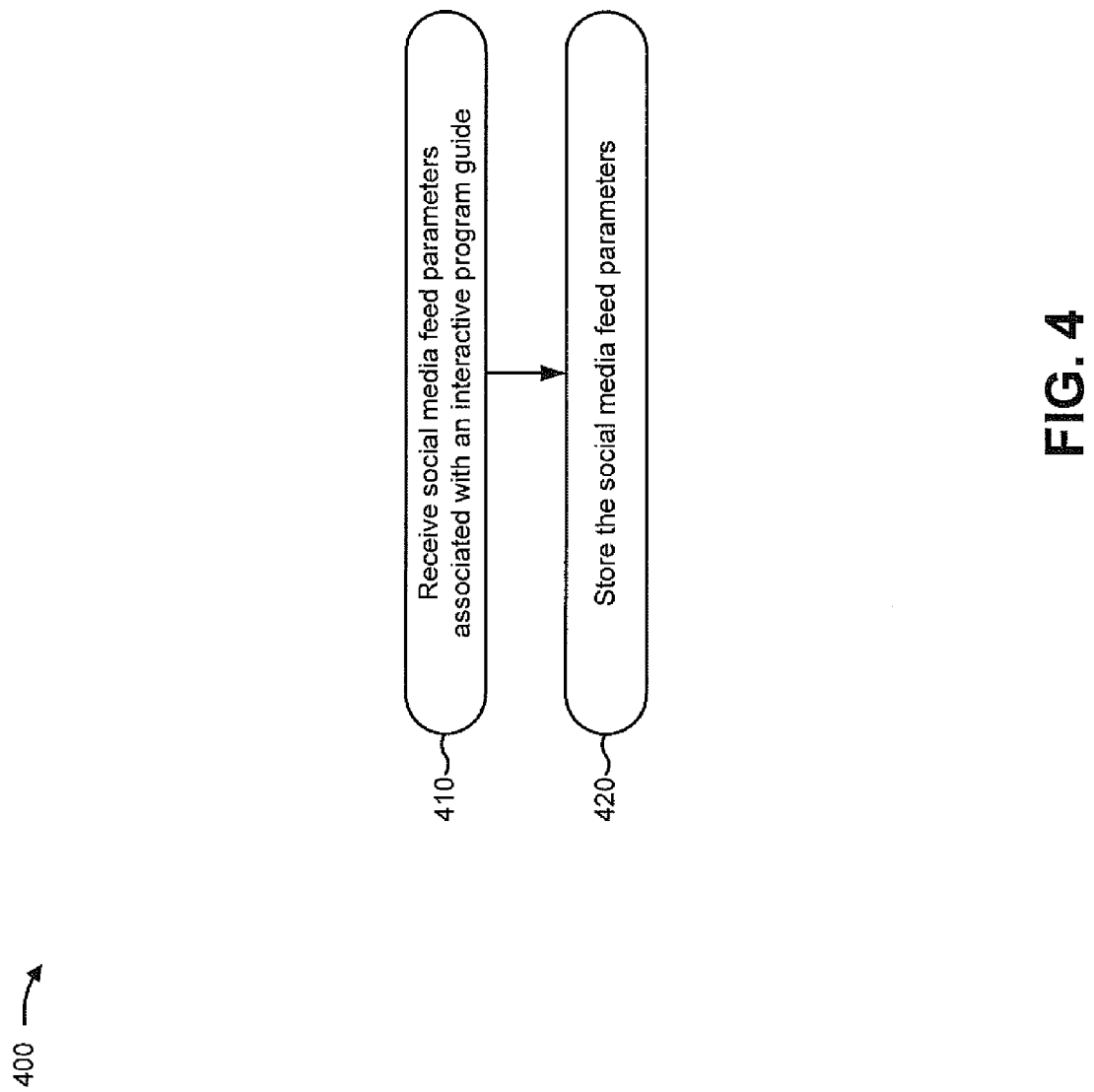
FIG. 4 is a flow chart of an example process for receiving and storing social media feed parameters associated with an interactive program guide.

FIG. 4 is a flow chart of an example process 400 for receiving and storing social media feed parameters associated with an interactive program guide. In some implementations, one or more process blocks of FIG. 4 may be performed by media client 220. In some implementations, one or more process blocks of FIG. 4 may be performed by another device or a group of devices separate from or including media client 220, such as another device included in environment 200.

As shown in FIG. 4, process 400 may include receiving social media feed parameters associated with an interactive program guide (block 410). For example, media client 220 may receive social media feed parameters associated with an IPG. In some implementations, media client 220 may receive the social media feed parameters when a user provides the social media feed parameters (e.g., via user device 210). Additionally, or alternatively, media client 220 may receive the social media feed parameters when the social media feed parameters are provided by another device, such as content server 250.

A social media feed parameter may include a parameter associated with a manner in which social media information, associated with a social media application and related to media content identified in the IPG, is to be received, stored, displayed, and/or provided via media client 220.

In some implementations, the social media feed parameter may be associated with determining whether the social media feed is to be displayed. For example, the social media feed parameter may indicate whether a social media feed feature is enabled or disabled (e.g., for all channels identified in the IPG). As another example, the social media feed parameter may indicate whether a social media feed is to be displayed for a group of channels (e.g., favorite channels identified by the user) identified in the IPG, for a particular channel identified in the IPG, for particular media content identified in the IPG (e.g., a particular television program on any channel), for a particular category of media content identified in the IPG (e.g., a sports category, a music video category, etc.), or the like. As yet another example, the social media feed parameter may identify a time (e.g., a time of day, a day of the week, etc.) during which a social media feed is to be displayed.

Additionally, or alternatively, the social media feed parameter may be associated with how the social media feed is to be displayed. For example, the social media feed parameter may indicate that the social media feed is to loop (e.g., such that the same social media information may be displayed multiple times) or that the social media feed is to display only additional (e.g., new) social media information after displaying the social media information once (e.g., when additional social media information is received, as described below). As another example, the social media feed parameter may indicate a portion of the display screen (e.g., a top portion, a bottom portion, a left portion, a right portion, etc.) where the social media feed is to be displayed. As yet another example, the social media feed parameter may indicate that the social media feed is to be displayed in a separate screen (e.g., that does not include the media content). As still another example, the social media feed parameter may indicate that the social media feed is to be sorted in particular manner (e.g., by date, by time, by rating, by social media application, by a relationship of a source of particular social media information to a user that provided the social media information, etc.). As a final example, the social media feed may indicate whether the social media feed is to include an icon associated with social media information included in the social media feed (e.g., such that the icon indicates that the social media information is associated with a social media application identified by the icon).

Additionally, or alternatively, the social media feed parameter may indicate a manner in which media client 220 is to determine the social media information to be included in the social media feed. For example, the social media feed parameter may identify a social media application whose social media information is to be included in the social media feed. In some implementations, the user may provide login information (e.g., a username, a password, etc.) associated with the social media application. As another example, the social media feed parameter may indicate an interval of time (e.g., 30 seconds, 5 minutes, etc.) at which media client 220 is to check for additional social media information to include in the social media feed.

Additionally, or alternatively, the social media feed parameter may indicate whether media client 220 is to store (e.g., in a memory location of media client 220) the social media information included in the social media feed and/or other information associated with the social media feed (e.g., information associated with a user interaction with the social media feed, etc.). The social media feed parameter may also identify a period time (e.g., 24 hours, 2 weeks, etc.) that media client 220 is to store the social media information and/or the other information.

In some implementations, media client 220 may receive the social media feed parameter based on user input. For example, media client 220 may provide, for display via display device 230, a user interface associated with one or more social media feed parameters, and the user may provide, via one or more input elements (e.g., text boxes, check boxes, drop down menus, radio buttons, etc.) included in the user interface, input associated with the one or more social media feed parameters. Additionally, or alternatively, media client 220 may receive the social media feed parameter based on determining a default social media feed parameter stored by media client 220 and/or content server 250 (e.g., when the user has not specified the social media feed parameter, when the user indicates that the user wishes to use a default social media feed parameter, etc.). In some implementations, media client 220 may receive multiple social media feed parameters.

As further shown in FIG. 4, process 400 may include storing the social media feed parameters (block 420). For example, media client 220 may store the social media feed parameters. In some implementations, media client 220 may store the social media feed parameters when media client 220 receives the social media feed parameters (e.g., after media client 220 receives the social media feed parameters). Additionally, or alternatively, media client 220 may store the social media feed parameters based on information, indicating that media client 220 is to store the social media feed parameters, received from another device, such as user device 210.

In some implementations, media client 220 may store the social media feed parameters in a memory location (e.g., a RAM, a ROM, a cache, a hard disk, etc.) of media client 220. Additionally, or alternatively, media client 220 may provide the social media feed parameters to another device for storage. For example, media client 220 may provide the social media feed parameters to content server 250 for storage.

In some implementations, media client 220 may store information associated with the social media feed parameters such that previous social media feed parameters (e.g., social media feed parameters provided by the user at an earlier time) are overwritten and/or deleted. Additionally, or alternatively, media client 220 may store the social media feed parameters such that media client 220 may retrieve the social media feed parameters at a later time. In some implementations, media client 220 may store the social media feed parameters with respect to media client 220 (e.g., such that the social media feed parameters apply to all users of media client 220). Additionally, or alternatively, media client 220 may store the social media feed parameters with respect to the user (e.g., such that the social media feed parameters apply only to the user when the user logs in to media client 220).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
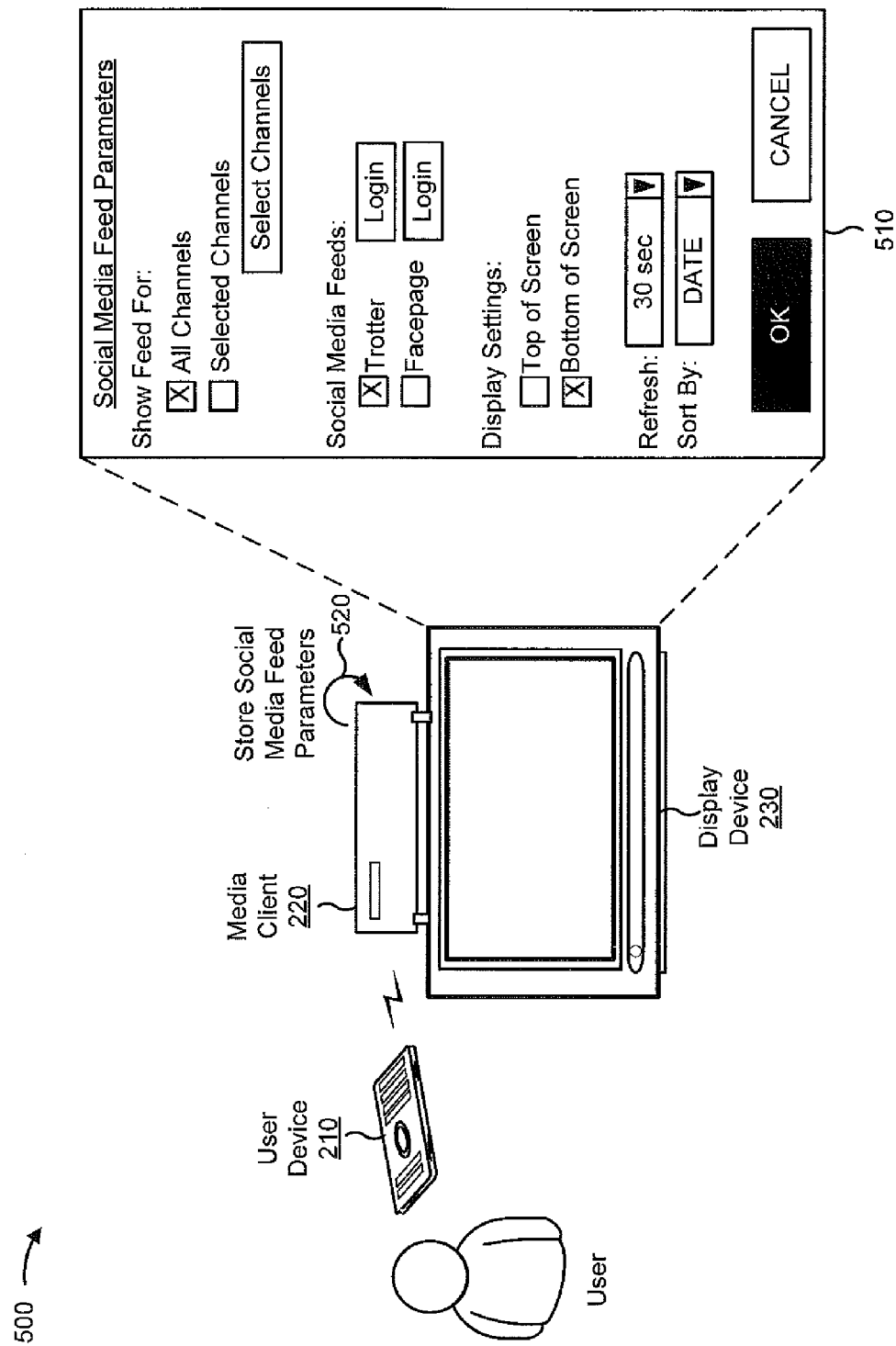
FIG. 5 is a diagram of an example implementation relating to the example process shown in FIG. 4.

FIG. 5 is diagram of an example implementation 500 relating to example process 400 shown in FIG. 4. For the purposes of example implementation 500, assume that a user, associated with media client 220, wishes to provide social media feed parameters associated with receiving, displaying, determining, and/or providing a social media feed via media client 220.

As shown in FIG. 5, and by reference number 510, media client 220 may provide, for display via display device 230, a user interface that allows the user to provide (e.g., via user device 210) input associated with the social media feed parameters. As shown, the user may indicate (e.g., by selecting a first check box) that media client 220 is to provide, for display, a social media feed for all channels identified in the IPG. As further shown, the user may indicate (e.g., by selecting a second check box) that the social media feed is to include social media information associated with a first social media application (e.g. Trotter), and the user may provide (e.g., by selecting a Login button) login information associated with the first social media application. As shown, the user may indicate (e.g., by not selecting a second check box) that the user does not wish the social media feed to include social media information associated with a second social media application (e.g., Facepage).

As further shown by reference number 510, the user may also indicate (e.g., by selecting a Bottom of Screen check box) that the social media feed is to be displayed in the bottom portion of the display screen, may indicate (e.g., via a first drop down menu) that media client 220 is to check for additional social media information every thirty seconds (e.g., Refresh: 30 sec), and may indicate (e.g., via a second drop down menu) that media client 220 is to sort the social media information, included in the social media feed, by date (e.g., Sort By: Date). As shown, the user may indicate (e.g., by selecting an OK button), that media client 220 is to store the social media feed parameters. As shown by reference number 520, media client 220 may store the social media feed parameters.

As indicated above, FIG. 5 is provided merely as an example. Other examples are possible and may differ from what was described with regard to FIG. 5.

Figure 6:
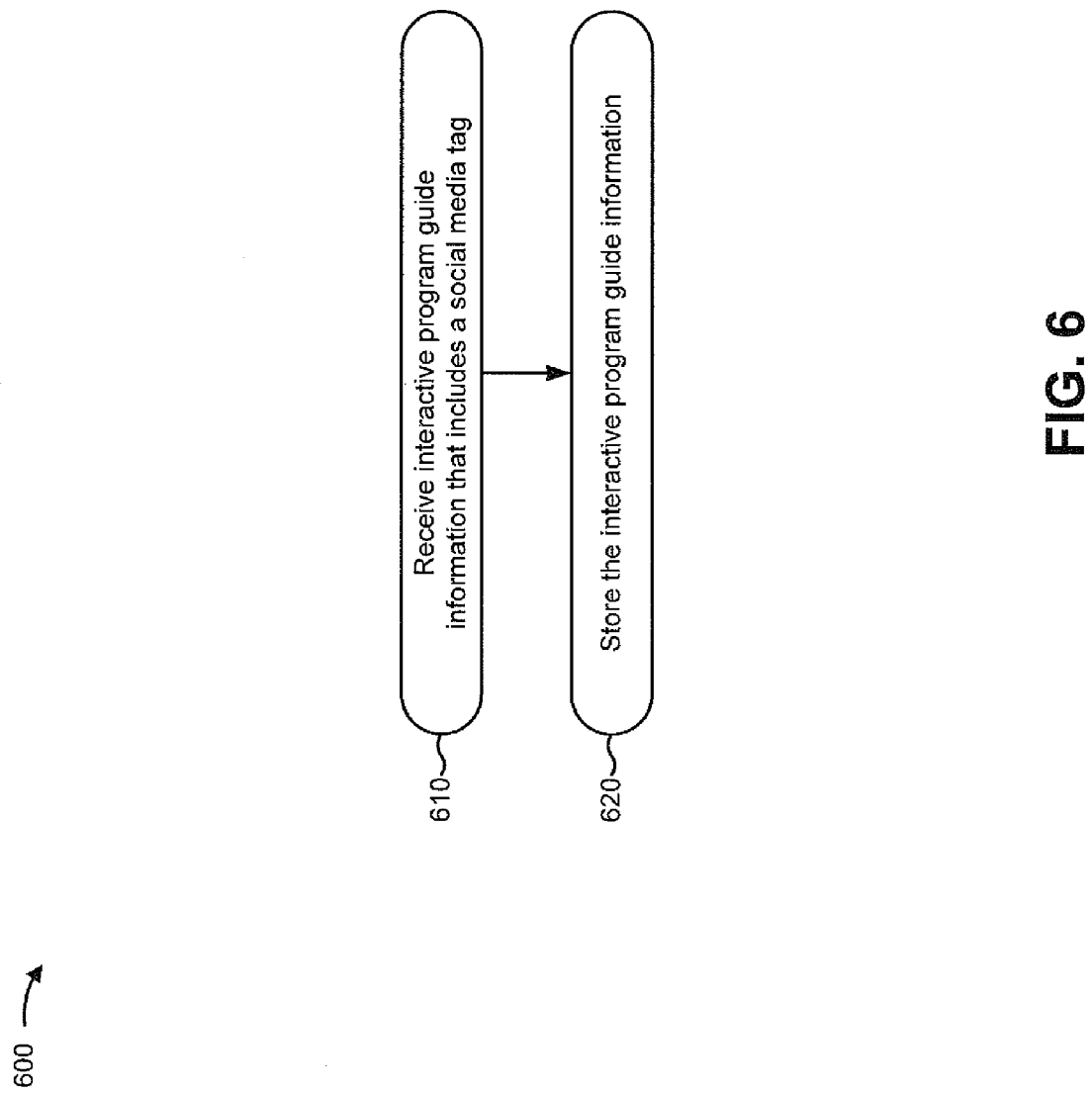
FIG. 6 is a flow chart of an example process for receiving and storing interactive program guide information that includes social media tags associated with media content identified in the interactive program guide.

FIG. 6 is a flow chart of an example process 600 for receiving and storing interactive program guide information that includes social media tags associated with media content identified in the interactive program guide. In some implementations, one or more process blocks of FIG. 6 may be performed by media client 220. In some implementations, one or more process blocks of FIG. 6 may be performed by another device or a group of devices separate from or including media client 220, such as another device included in environment 200.

As shown in FIG. 6, process 600 may include receiving interactive program guide information that includes a social media tag (block 610). For example, media client 220 may receive IPG information that includes social media tags. In some implementations, media client 220 may receive the IPG information when the IPG information is provided by another device, such as content server 250.

IPG information may include interface information used to generate an interface for an IPG. For example, the interface information may include information about menus to be displayed in the IPG. Additionally, or alternatively, the IPG information may include schedule information indicating a schedule or a program guide for media content. For example, the schedule or the program guide may indicate which media content will be played on certain channels at certain times and/or which video-on-demand (VOD) content is offered via a VOD service.

In some implementations, the IPG information may include social media tags associated with media content identified in the IPG. A social media tag may include metadata information, associated with media content identified in the IPG, that may be used to determine social media information associated with the media content. For example, assume that the media content is a television program titled Program A. In this example, the social media tag may include a string of characters (e.g., #ProgramA) related to the media content. Here, the string of characters may be used, by media client 220, to determine social media information associated with Program A (e.g., media client 220 may determine the social media information by requesting, from a social media server, social media information that includes the #ProgramA string of characters). In some implementations, the media content may be associated with multiple social media tags. For example, the social media tag may relate to a name of the media content, a name of a person associated with the media content (e.g., an actor, a director, a producer, etc.), a name of a location associated with the media content, an identifier of an object, a character, a topic, etc. associated with the media content, etc.

In some implementations, media client 220 may periodically receive the IPG information. For example, media client 220 may receive, from content server 250, the IPG information once an hour, once a day, once a week, etc. In some implementations, media client 220 may request the IPG information from content server 250. Additionally, or alternatively, content server 250 may provide the IPG information (e.g., when content server 250 is configured to provide the IPG information at a particular interval of time). In some implementations, media client 220 may receive updated IPG information. For example, media client 220 may receive the IPG information from content server 250. Content server 250 may then determine (e.g., based on additional information provided to content server 250) updated IPG information (e.g., when a schedule included in the IPG is modified, when additional social media tags are provided to content server 250, etc.), and content server 250 may provide the updated IPG information to media client 220. Media client 220 may then receive the updated IPG information provided by content server 250.

As further shown in FIG. 6, process 600 may include storing the interactive program guide information (block 620). For example, media client 220 may store the IPG information. In some implementations, media client 220 may store the IPG information when media client 220 receives the IPG information (e.g., after media client 220 receives the IPG information). Additionally, or alternatively, media client 220 may store the IPG information based on information, indicating that media client 220 is to store the IPG information, received from another device, such as content server 250.

In some implementations, media client 220 may store the IPG information in a memory location (e.g., a RAM, a ROM, a cache, a hard disk, etc.) of media client 220. In some implementations, media client 220 may store the IPG information such that previous IPG information (e.g., IPG information provided by content server 250 at an earlier time) is updated, overwritten, and/or deleted. Additionally, or alternatively, media client 220 may store the IPG information such that media client 220 may retrieve the IPG information at a later time (e.g., such that media client 220 may provide, for display, the IPG information, such that media client 220 may determine the social media tags included in the IPG information, etc.).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
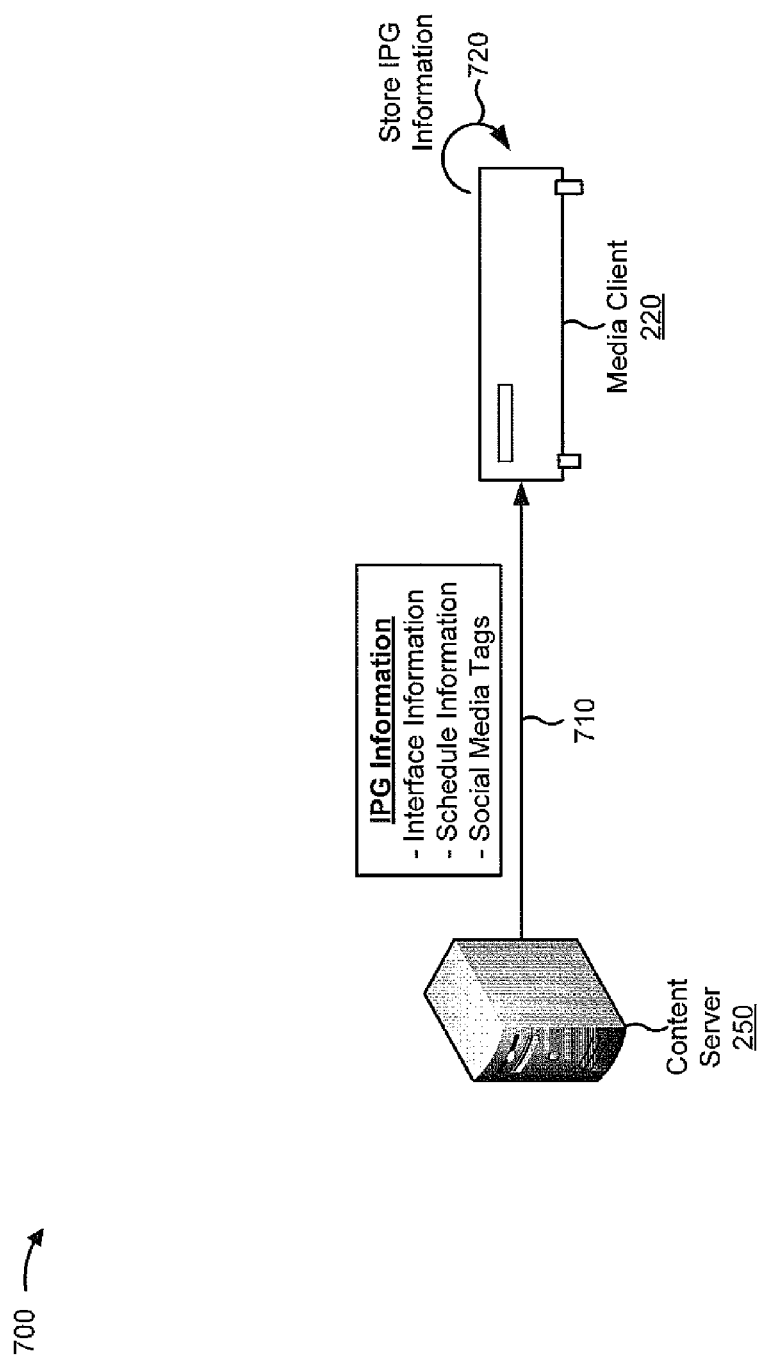
FIG. 7 is a diagram of an example implementation relating to the example process shown in FIG. 6.

FIG. 7 is a diagram of an example implementation 700 relating to example process 600 shown in FIG. 6. For the purpose of example implementation 700, assume that content server 250 has received (e.g., from another device) IPG information. Further, assume that content server 250 is configured to provide IPG information to media client 220 after content server 250 receives IPG information.

As shown in FIG. 7, and by reference number 710, content server 250 may provide the IPG information to media client 220. As shown, the IPG information may include interface information associated with the IPG, schedule information associated with media content identified in the IPG, and social media tags related to the media content identified in the IPG. As shown by reference number 720, media client 220 may receive the IPG information, and may store (e.g., in a memory location of media client 220) the IPG information.

As indicated above, FIG. 7 is provided merely as an example. Other examples are possible and may differ from what was described with regard to FIG. 7.

FIG. 8 is a flow chart of an example process 800 for identifying a social media tag, associated with media content identified in an interactive program guide, and providing, for display, a social media feed associated with the media content and based on the social media tag. In some implementations, one or more process blocks of FIG. 8 may be performed by media client 220. In some implementations, one or more process blocks of FIG. 8 may be performed by another device or a group of devices separate from or including media client 220, such as another device included in environment 200.

As shown in FIG. 8, process 800 may include receiving an indication associated with media content identified in an interactive program guide (block 810). For example, media client 220 may receive an indication associated with media content identified in an IPG. In some implementations, media client 220 may receive the indication when a user, associated with media client 220, provides (e.g., via user device 210) input associated with the media content (e.g., when the user indicates, via the IPG, that the user wishes to view the media content, when the user selects the media content within the IPG, etc.). Additionally, or alternatively, media client 220 may receive the indication when the indication is provided by another device, such as content server 250.

In some implementations, the indication may be associated with the user viewing the media content. For example, the user, associated with media client 220, may provide (e.g., via user device 210) input indicating that the user wishes to view the media content (e.g., via display device 230). In this example, media client 220 may receive the indication to provide, for display, the media content. Additionally, or alternatively, the indication may be associated with viewing an information screen associated with the media content (e.g., when the user wishes to view, via the IPG, information related to the media content). Additionally, or alternatively, the indication may be associated with selecting the media content within the IPG (e.g., when the user navigates to a portion of a media content schedule, associated with the media content, such that the portion of the media content schedule is highlighted). In some implementations, the media content may include live media content (e.g., when the media content is airing when selected by the user), pre-recorded media content (e.g., the media content was recorded to a digital video recorder (DVR) associated with the user), on-demand media content (e.g., when the user is accessing on-demand services provided via media client 220).

As further shown in FIG. 8, process 800 may include determining social media feed parameters associated with the interactive program guide (block 820). For example, media client 220 may determine social media feed parameters associated with the IPG. In some implementations, media client 220 may determine the social media feed parameters after media client 220 receives the indication associated with the media content. Additionally, or alternatively, media client 220 may determine the social media feed parameters when media client 220 receives information, indicating that media client 220 is to determine the social media feed parameters, from another device, such as user device 210.

As described above, a social media feed parameter may include a parameter associated with a manner in which social media information, associated with a social media application and related to media content identified in the IPG, is to be received, stored, displayed, and/or provided via media client 220. In some implementations, media client 220 may determine the social media feed parameters based on information stored by media client 220 (e.g., when media client 220 receives and stores the social media feed parameters, as described above). Additionally, or alternatively, media client 220 may determine the social media feed parameters based on information received from another device (e.g., user device 210, content server 250, etc.).

As further shown in FIG. 8, process 800 may include determining, based on the social media feed parameters, that a social media feed, associated with the media content, is to be displayed (block 830). For example, media client 220 may determine, based on the social media feed parameters, that a social media feed, associated with the media content, is to be displayed. In some implementations, media client 220 may determine that the social media feed is to be displayed after media client 220 determines the social media feed parameters. Additionally, or alternatively, media client 220 may determine that the social media feed is to be displayed after media client 220 receives the indication associated with the media content. Additionally, or alternatively, media client 220 may determine that the social media feed is to be displayed when media client 220 receives information, indicating that media client 220 is to determine that the social media feed is to be displayed, from another device, such as user device 210.

In some implementations, media client 220 may determine that the social media feed is to be displayed based on the social media feed parameters. For example, media client 220 may determine a first social media feed parameter indicating that a social media feed feature is enabled, and a second social media feed parameter indicating that a social media feed is to be displayed for one or more channels identified in the IPG (e.g., regardless of the media content provided via the channel).

Additionally, or alternatively, media client 220 may determine that the social media feed is to be displayed based on the social media feed parameters and based on the indication associated with the media content. For example, media client 220 may determine (e.g., based on the social media feed parameters) that the social media feed feature is enabled for a particular group of channels. In this example, if the indication is associated with media content available on a channel included in the particular group of channels, then media client 220 may determine that the social media feed is to be displayed.

In some implementations, media client 220 may also determine, based on the social media feed parameters, how the social media feed is to be displayed, a manner in which media client 220 is to determine social media information to be included in the social media feed, and/or whether media client 220 is to store the social media information and/or other information associated with the social media feed, as described above with regard to block 410.

As further shown in FIG. 8, process 800 may include identifying a social media tag associated with the media content (block 840). For example, media client 220 may identify a social media tag associated with the media content. In some implementations, media client 220 may identify the social media tag, associated with the media content, after media client 220 determines that the social media feed is to be displayed. Additionally, or alternatively, media client 220 may identify the social media tag after media client 220 receives the indication associated with the media content.

In some implementations, media client 220 may determine the social media tag based on IPG information stored by media client 220. For example, media client 220 may receive and store IPG information (e.g., as described above with regard process 600) that includes social media tags, associated with media content identified in the IPG, and media client 220 may determine the social media tag, associated with the media content, based on the stored IPG information. Additionally, or alternatively, media client 220 may determine the social media tag based on information provided by user device 210 (e.g., when the user provides, via user device 210, the social media tag information). Additionally, or alternatively, media client 220 may determine the social media tag based on information provided by content server 250 (e.g., when content server 250 provides the social media tag to media client 220).

As further shown in FIG. 8, process 800 may include receiving social media information associated with the social media tag (block 850). For example, media client 220 may receive social media information associated with the social media tag. In some implementations, media client 220 may receive the social media information after media client 220 identifies the social media tag.

Social media information may include one or more strings of characters (e.g., tweets, comments, statuses, etc.), provided by other users to social media accounts associated with social media applications (e.g., Twitter, Facebook, Google+, etc.) of the other users, that include the social media tag.

In some implementations, media client 220 may receive the social media information based on a request associated with the social media tag. For example, media client 220 may send, to social media server 260 associated with a social media application, a request for social media server 260 to provide social media information that includes the social media tag. Social media server 260 may receive the request, may determine (e.g., based on the social media tag) the social media information, and may provide the social media information to media client 220. In this example, media client 220 may receive the social media information based on social media server 260 providing the social media information. In some implementations, media client 220 may receive the social media information from multiple social media servers 260 (e.g., when the social media feed parameters indicate that the social media feed is to include social media information associated with multiple social media applications).

As further shown in FIG. 8, process 800 may include providing, for display, the social media feed including the social media information (block 860). For example, media client 220 may provide, for display, the social media feed including the social media information. In some implementations, media client 220 may provide the social media feed for display after media client 220 receives the social media information. Additionally, or alternatively, media client 220 may provide the social media feed for display when media client 220 receives information, indicating that media client 220 is to provide the social media feed for display, from another device, such as user device 210 and/or content server 250.

In some implementations, media client 220 may provide the social media feed for display in accordance with the social media feed parameters, as described above. In some implementations, media client 220 may provide the social media feed for display within a display screen that also displays the media content. For example, the social media feed may be displayed in a first portion of the display screen, and the media content may be displayed in a second portion of the display screen. In this example, when a first portion of the social media information, included in the social media feed, is displayed in the first portion of the display screen, the user may indicate (e.g., by selecting an arrow, by selecting a Next button, etc.) that the user wishes to view a second portion of the social media information included in the social media feed. Alternatively, media client 220 may automatically cycle through portions of the social media information by displaying the first portion of the social media information for a period of time (e.g., 10 seconds, etc.), then displaying the second portion of the social media information (e.g., rather than the first portion) for the period of time, and so forth. Alternatively, media client 220 may provide (e.g., based on an indication from the user) the social media feed for display in a display screen that includes only the social media feed. In some implementations, the social media feed may include social media information associated with multiple social media applications, and the user may indicate (e.g., by selecting a button of user device 210) that the user wishes to view only social media information with a particular social media application.

In some implementations, media client 220 may allow the user to interact with the social media information included in the social media feed. For example, media client 220 may provide a portion of the social media information for display in the social media feed, and media client 220 may allow the user to interact with the portion of social media information by providing, for selection by the user, an input element (e.g., a Like button, a Repost button, a Favorite button, etc.) associated with a social media application related to the portion of social media information. In this example, media client 220 may send, to social media server 260, information associated with user interaction for posting to the social media account associated with the user.

Additionally, or alternatively, media client 220 may allow the user to provide feedback associated with the social media information included in the social media feed. For example, media client 220 may provide the portion of social media information for display in the social media feed, and may also provide one or more input elements (e.g., a vote up button, a vote down button, a thumbs-up button, a thumbs-down button, etc.) that allow the user to rate the portion of social media information. As another example, media client 220 may provide the portion of social media information for display in the social media feed, and may also provide one or more input elements (e.g., a button, a radio button, etc.) that allows the user to report (e.g., to a service provider via content server 250) the portion of social media information as offensive, profane, inappropriate, etc.

In some implementations, media client 220 may store information associated with an interaction and/or feedback provided by the user. For example, the user may interact with the social media information, and media client 220 may store information associated with the interaction, such as a title of the program associated with the interaction, a date of the interaction, a time of the interaction, a type of the interaction (e.g., a Like, a Favorite, a Repost, etc.), and/or another type of information. In some implementations, media client 220 may store the information for a particular period of time (e.g., two weeks, four weeks, etc.). Additionally, or alternatively, the information associated with the interaction and/or the feedback may be stored by content server 250.

In some implementations, media client 220 may determine (e.g., by sending an additional request including the social media tag in the manner described above) whether social media server 260 has received additional social media information that is to be included in the social media feed. In some implementations, media client 220 may determine whether social media server 260 has received additional social media information on a periodic basis (e.g., every 30 seconds, every 5 minutes, every 30 minutes, etc.). Additionally, or alternatively, media client 220 may determine whether social media server 260 has received additional social media information based on a social media feed parameter stored by media client 220. If media client 220 determines that social media server 260 has received additional social media information that is to be included in the social media feed, media client 220 may update the social media feed and provide the additional social media information for display, accordingly.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
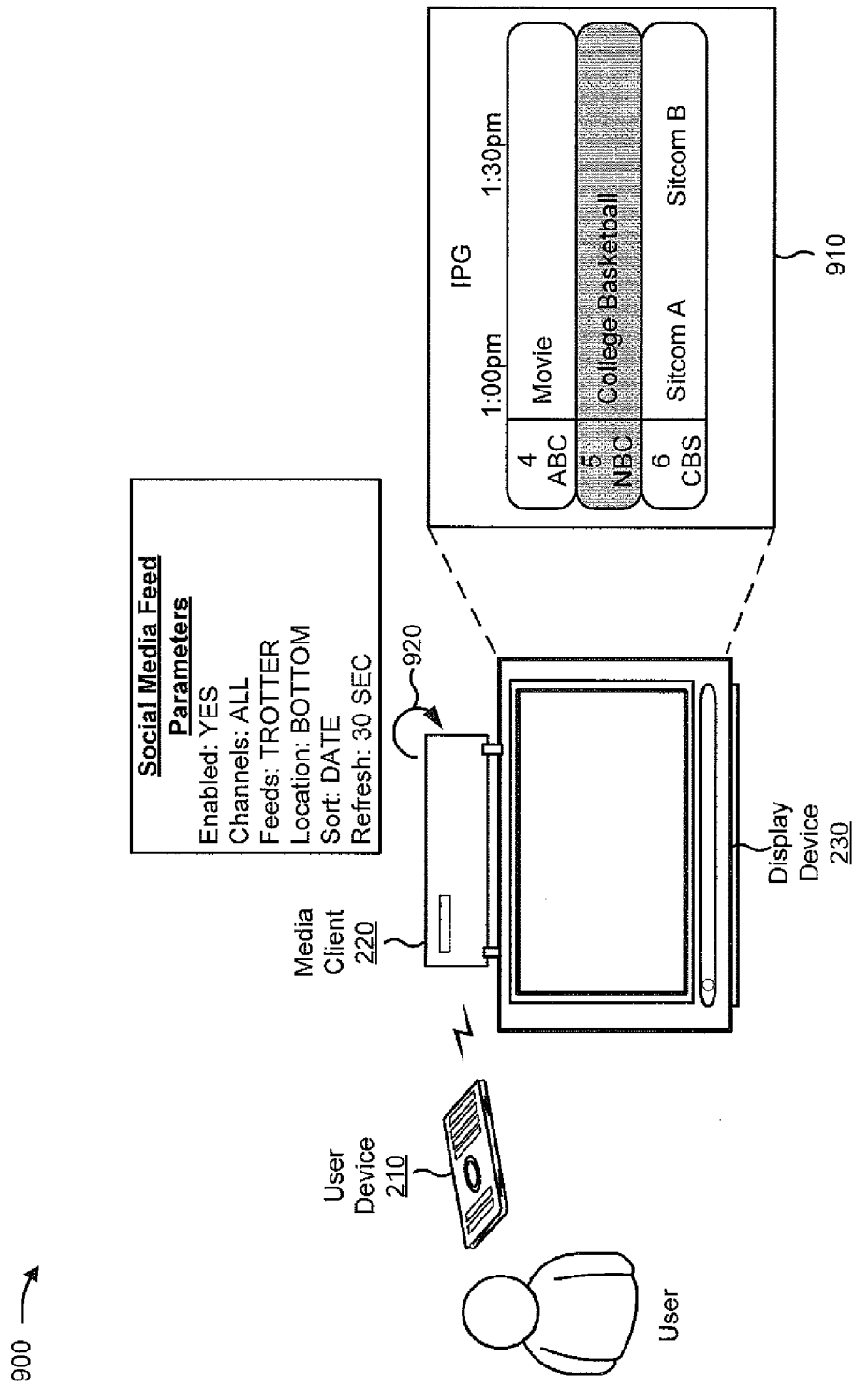
FIGS. 9A-9C are diagrams of an example implementation relating to the example process shown in FIG. 8.
Figure 9B:
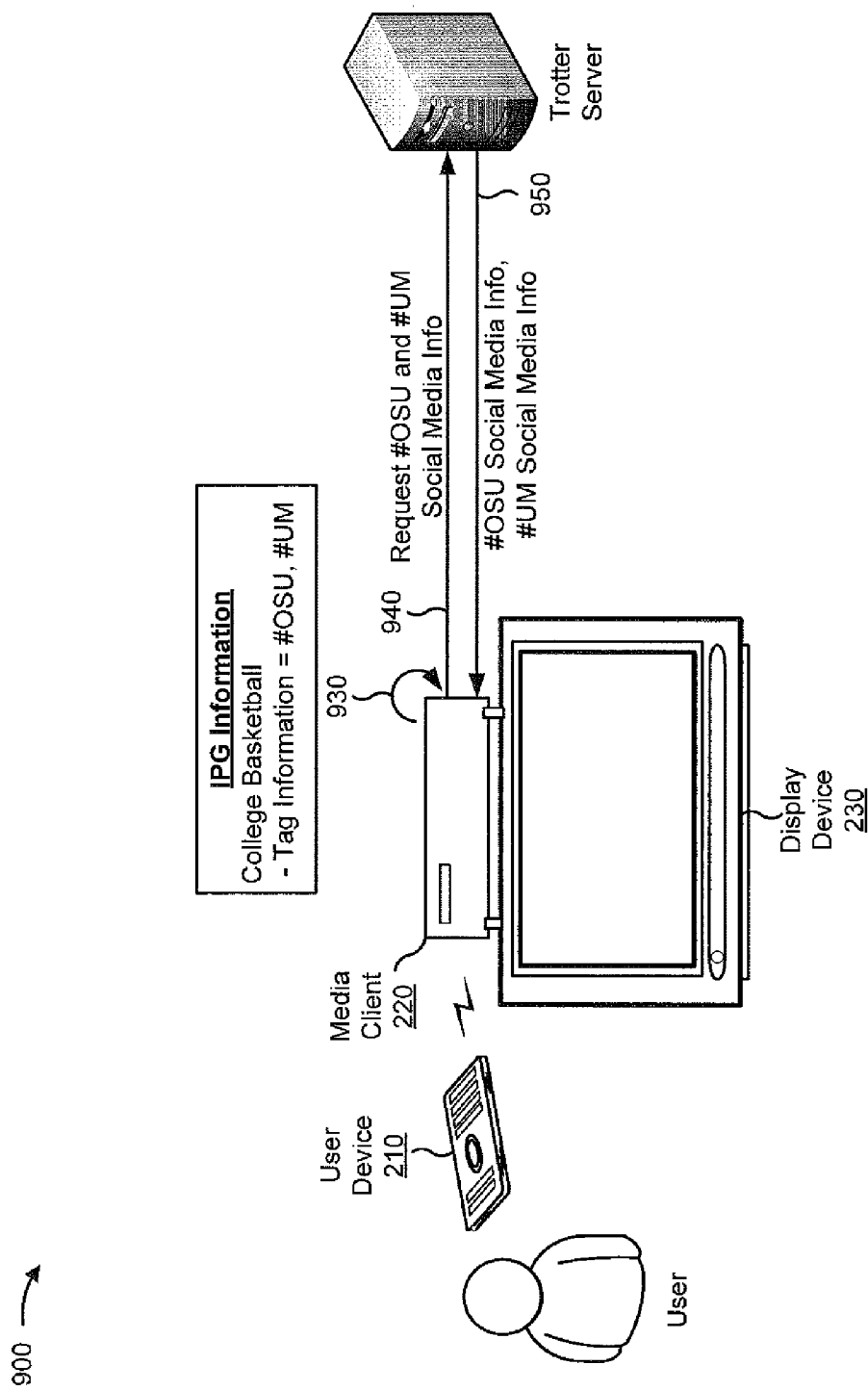
Figure 9C:
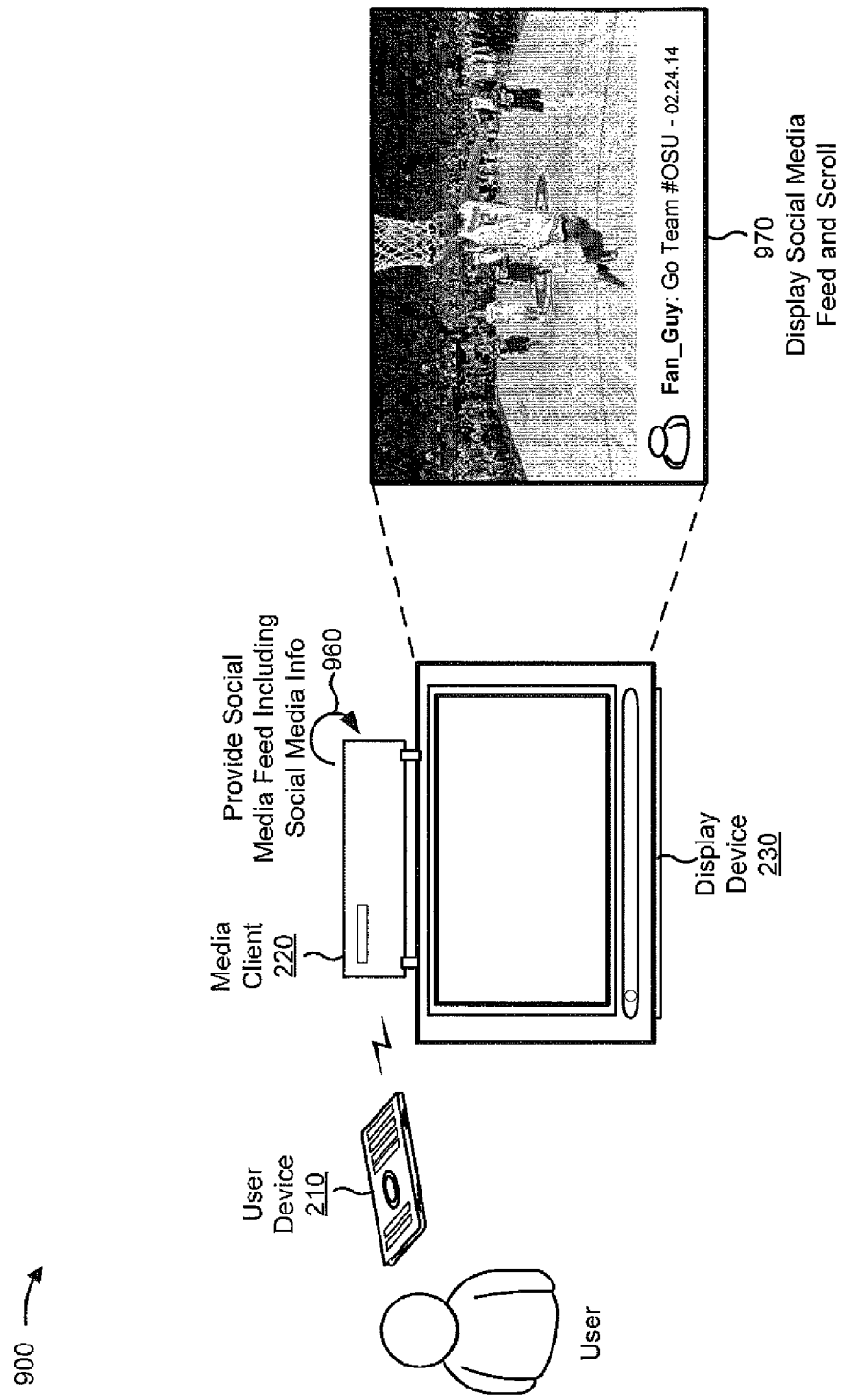

FIGS. 9A-9C are diagrams of an example implementation 900 relating to example process 800 shown in FIG. 8. For the purposes of example implementation 900, assume that media client 220 stores social media feed parameters associated with an IPG. Further, assume that media client 220 stores IPG information that includes social media tags related to media content identified in the IPG. Finally, assume that a user is navigating (e.g., using user device 210) the IPG, provided by the media client, via display device 230.

As shown in FIG. 9A, and by reference number 910, the user may navigate the IPG and may indicate (e.g., by selecting a schedule entry in the IPG) that the user wishes to view media content identified in the IPG as "College Basketball." As shown by reference number 920, media client 220 may determine social media feed parameters associated with the IPG. As shown, the social media feed parameters may indicate that media client 220 is to provide, for display, a social media feed associated with the media content since a social media feed feature is enabled for all channels identified in the IPG (e.g., Enabled=YES, Channels=ALL). As further shown, media client 220 may determine social media feed parameters indicating that the social media feed is to include social media information associated with a particular social media application (e.g., Feeds: Trotter), that the social media feed is to be displayed at the bottom of a display screen (e.g., Location: Bottom), that social media information included in the social media feed is to be sorted by date (e.g., Sort: Date), and that media client 220 is to check for additional social media information, to be included in the social media feed, every thirty seconds (e.g., Refresh: 30 sec).

As shown in FIG. 9B, and by reference number 930, media client 220 may determine (e.g., based on the IPG information stored by media client 220 and associated with the media content) two social media tags related to the media content (e.g., #OSU, #UM). As shown by reference number 940, media client 220 may send, to a Trotter server associated with the Trotter social media application, a request for the Trotter server to provide social media information including either of the two social media tags. As shown by reference number 950, the Trotter server may receive the request, may determine the social media information that includes either of the two social media tags, and may provide the social media information to media client 220. As shown, media client 220 may receive the social media information provided by the Trotter server.

As shown in FIG. 9C, and by reference number 960, media client 220 may provide, for display via display device 230, the social media feed that includes the social media information received from the Trotter server. As shown by reference number 970, media client 220 may provide the social media feed for display in accordance with the social media parameters (e.g., media client 220 may cause the social media feed to scroll through the social media information and may update the social media feed every thirty seconds).

As indicated above, FIGS. 9A-9C are provided merely as an example. Other examples are possible and may differ from what was described with regard to FIGS. 9A-9C.

Implementations described herein may allow a media client to provide, for display via a display device, a social media feed that includes social media information associated with one or more social media applications and related to media content being displayed via the display device. In this way, the user may view the media content and may view and/or interact with the social media information via the display device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
provide, for display, a user interface;
receive, via the user interface, social media feed parameters from a user device of a user;
receive interactive program guide (IPG) information,
the IPG information including one or more social media tags associated with media content identified in an IPG;
determine, based on the social media feed parameters received via the user interface, that a social media feed is to be displayed concurrently with the media content, the social media feed being associated with the media content;
receive, from the user device, social media tag information;
determine, from the social media tag information, a social media tag,
the social media tag including at least one of:
information identifying a topic associated with the media content, or
information identifying a location associated with the media content;
send a request, to a social media server, requesting social media information that includes the social media tag;
receive the social media information based on sending the request,
the social media information including information associated with a social media application; and
provide the social media feed and the media content to be concurrently displayed,
the social media feed including the social media information, and
the social media feed being provided in accordance with the social media feed parameters received via the user interface,
the social media feed parameters including:
information identifying an interval of time at which the one or more processors are to check for additional social media information, that includes the social media tag, to include in the social media feed, and
information identifying one or more channels, of a plurality of channels identified by the IPG, with which the social media feed is to be provided.

2. The device of claim 1, where the social media feed parameters further include information indicating that the social media feed is to be sorted based on at least one of a date or a time.

3. The device of claim 1, where the social media tag is a first social media tag;
where the one or more processors are further to:
store the IPG information; and
identify a second social media tag, of the one or more social media tags, based on the stored IPG information; and
where the one or more processors, when sending the request, to the social media server, requesting the social media information, are to:
send the request, to the social media server, requesting social media information that includes the second social media tag.

4. The device of claim 1, where the one or more processors are further to:
receive the additional social media information that includes the social media tag;
update the social media feed to create an updated social media feed,
the updated social media feed including the additional social media information; and
provide, for display, the updated social media feed.

5. The device of claim 1, where the social media feed parameters include a social media feed parameter that indicates a time during which the social media feed is to be displayed and another social media feed parameter that at least one of:
indicates that the social media feed is to be displayed;

identifies a manner in which the social media feed is to be displayed;
identifies a manner in which the social media information is to be determined; or
indicates whether the social media information is to be stored.

6. The device of claim 1, where the one or more processors, when providing the social media feed for display, are to:
provide, for display, one or more input elements that permit the user to interact with the social media feed.

7. The device of claim 1, where the one or more processors are further to:
store information associated with a feedback provided by the user.

8. A non-transitory computer-readable medium storing instructions, the instructions comprising:
one or more instructions that, when executed by one or more processors, cause the one or more processors to:
provide, for display, a user interface;
receive, via the user interface, social media feed parameters from a user device of a user;
receive interactive program guide (IPG) information,
the IPG information including one or more social media tags associated with media content identified in an IPG;
determine, based on the social media feed parameters received via the user interface, that a social media feed, associated with the media content, is to be displayed adjacent to the media content;
receive, from the user device, social media tag information;
determine, from the social media tag information, a social media tag,
the social media tag including at least one of:
information identifying a location associated with the media content, or
information identifying an object associated with the media content;
send a request, to a social media server, requesting social media information that includes the social media tag;
receive the social media information,
the social media information including information associated with a social media application; and
provide, for display, the social media feed and the media content,
the social media feed being provided for display adjacent to the media content,
the social media feed including the social media information, and
the social media feed being provided such that the social media feed being displayed in accordance with the social media feed parameters received via the user interface,
the social media feed parameters including:
information indicating that the social media feed is to be sorted based on at least one of a date or a time, and
information identifying one or more channels, of a plurality of channels identified by the IPG, with which the social media feed is to be provided.

9. The non-transitory computer-readable medium of claim 8, where the social media feed parameters further include information identifying an interval of time at which the one or more processors are to check for additional social media information, associated with the one or more social media tags, to include in the social media feed.

10. The non-transitory computer-readable medium of claim 8, where the social media tag is a first social media tag;
where the one or more instructions, when executed by the one or more processors, further cause the one or more processors to:
store the IPG information; and
identify a second social media tag, of the one or more social media tags, based on the stored IPG information; and
where the one or more instructions, that cause the one or more processors to send the request, to the social media server, requesting the social media information, cause the one or more processors to:
send the request, to the social media server, requesting social media information that includes the second social media tag.

11. The non-transitory computer-readable medium of claim 8, where the one or more instructions, when executed by the one or more processors, further cause the one or more processors to:
receive additional social media information associated with the one or more social media tags;
update the social media feed to create an updated social media feed,
the updated social media feed including the additional social media information; and
provide, for display, the updated social media feed.

12. The non-transitory computer-readable medium of claim 8, where the social media feed parameters further include a social media feed parameter that identifies a category of media content for which the social media feed is to be provided and another social media feed parameter that at least one of:
indicates that the social media feed is to be displayed;
identifies a manner in which the social media feed is to be displayed;
identifies a manner in which the social media information is to be determined; or
indicates whether the social media information is to be stored.

13. The non-transitory computer-readable medium of claim 8, where the one or more instructions, that cause the one or more processors to provide the social media feed for display, cause the one or more processors to:
provide, for display, one or more input elements that permit the user to rate the social media information included in the social media feed.

14. The non-transitory computer-readable medium of claim 8, where the IPG information further includes schedule information associated with the media content.

15. A method, comprising:
providing for display, by a device, a user interface;
receiving, by the device and via the user interface, a set of social media feed parameters from a user device;
receiving, by the device, interactive program guide (IPG) information,
the IPG information including one or more social media tags associated with media content identified in an IPG;
determining, by the device and based on the set of social media feed parameters, that a social media feed is to be displayed along with the media content,
the social media feed being associated with the media content;
receiving, by the device and from the user device, social media tag information;
determining, by the device and from the social media tag information, a social media tag,
the social media tag including information identifying a location associated with the media content and at least one of:
information identifying a topic associated with the media content, or
information identifying an object associated with the media content;
sending, by the device, a request, to a social media server, requesting social media information that includes the social media tag;
receiving, by the device, the social media information,
the social media information including information associated with a social media application; and
causing, by the device, the social media feed and the media content to be displayed,
the social media feed including the social media information, and
the social media feed being displayed in accordance with the set of social media feed parameters,
the set of social media feed parameters including at least one of:
information identifying one or more channels, of a plurality of channels identified by the IPG, with which the social media feed is to be provided, or
information indicating that the social media feed is to be sorted based on at least one of a date or a time.

16. The method of claim 15, where the social media tag is a first social media tag;
where the method further comprises:
storing the IPG information; and
identifying a second social media tag based on the stored IPG information; and
where sending the request, to the social media server, requesting the social media information comprises:
sending the request, to the social media server, requesting social media information that includes the second social media tag.

17. The method of claim 15, further comprising:
receiving additional social media information associated with the social media tag;
updating the social media feed to create an updated social media feed,
the updated social media feed including the additional social media information; and
causing the updated social media feed to be displayed in accordance with a social media feed parameter, of the set of social media feed parameters, indicating that the social media feed is to be sorted further based on at least one of rating or social media application.

18. The method of claim 15, where the set of social media feed parameters further includes another social media feed parameter that at least one of:
indicates that the social media feed is to be displayed;
identifies a manner in which the social media feed is to be displayed;
identifies a manner in which the social media information is to be determined; or
indicates whether the social media information is to be stored.

19. The method of claim 15, where causing the social media feed to be displayed comprises:

causing one or more input elements to be displayed, the one or more input elements allowing a user to interact with the social media feed.

20. The method of claim 15, further comprising:
receiving, by the device, an indication that the media content is to be displayed.

\* \* \* \* \*